United States Patent
Hill

(10) Patent No.: US 10,137,399 B2
(45) Date of Patent: Nov. 27, 2018

(54) VENTILATION SYSTEM AND ASSOCIATED OPERATING METHOD FOR USE DURING A SERIOUS ACCIDENT IN A NUCLEAR INSTALLATION

(71) Applicant: AREVA GMBH, Erlangen (DE)

(72) Inventor: Axel Hill, Stockstadt (DE)

(73) Assignee: AREVA GmbH, Erlangen (DE)

(*) Notice: Subject to any disclaimer, the term of this patent is extended or adjusted under 35 U.S.C. 154(b) by 0 days.

(21) Appl. No.: 15/651,152

(22) Filed: Jul. 17, 2017

(65) Prior Publication Data
US 2017/0312679 A1  Nov. 2, 2017

Related U.S. Application Data

(63) Continuation of application No. PCT/EP2016/050255, filed on Jan. 8, 2016.

(30) Foreign Application Priority Data

Jan. 16, 2015 (DE) .................. 10 2015 200 679

(51) Int. Cl.
*B01D 53/22* (2006.01)
*B01D 53/04* (2006.01)
(Continued)

(52) U.S. Cl.
CPC ........... *B01D 53/0446* (2013.01); *G21D 1/02* (2013.01); *G21D 3/06* (2013.01); *G21F 7/015* (2013.01);
(Continued)

(58) Field of Classification Search
CPC ....... G21F 7/015; G21F 9/02; B01D 53/0446; B01D 2257/10; Y02E 30/40
See application file for complete search history.

(56) References Cited

U.S. PATENT DOCUMENTS 3,594,984 A * 7/1971 Toyama ................. B01D 53/04
95/126
3,944,646 A    3/1976 Martin
(Continued)

FOREIGN PATENT DOCUMENTS

DE         3418972 A1   11/1985
DE    102013209191 A1   11/2014
(Continued)

OTHER PUBLICATIONS

KTA-Geschaeftsstelle C/O BFS; Ventilation System in Nuclear Power Plants; Safety Standards of the Nuclear Safety Standards Commission (KTA), Nov. 2005; KTA 3601.

*Primary Examiner* — Anthony R Shumate
(74) *Attorney, Agent, or Firm* — Laurence A. Greenberg; Werner H. Stemer; Ralph E. Locher

(57) ABSTRACT

A ventilation system for an operating space accessible to operators in a nuclear installation is intended to allow a supply of decontaminated fresh air for a period of a few hours in the event of serious accidents involving the release of radioactive activity. In particular, the component of radioactive inert gases in the fresh air supplied to the operating space should be as small as possible. For this purpose, the ventilation system has a supply air line that is guided from an external inlet to the operating space, and into which a first fan and a first inert gas adsorber column are connected. An exhaust air line is guided from the operating space to an external outlet, and into which a second fan and a second inert gas adsorber column are connected. A switching device is provided for interchanging the roles of the first and second inert gas adsorber columns.

14 Claims, 2 Drawing Sheets

(51) Int. Cl.
  *G21F 9/02* (2006.01)
  *G21D 1/02* (2006.01)
  *G21D 3/06* (2006.01)
  *G21F 7/015* (2006.01)

(52) U.S. Cl.
  CPC ............ *G21F 9/02* (2013.01); *B01D 2257/10* (2013.01); *Y02E 30/40* (2013.01)

(56) References Cited

U.S. PATENT DOCUMENTS

| | | | |
|---|---|---|---|
| 4,228,197 A * | 10/1980 | Means | A23L 3/3418 422/40 |
| 4,369,048 A | 1/1983 | Pence | |
| 4,754,611 A * | 7/1988 | Hosaka | A23B 7/144 426/314 |
| 4,816,041 A | 3/1989 | Ringel et al. | |
| 4,881,958 A | 11/1989 | Eckardt et al. | |
| 6,610,124 B1 * | 8/2003 | Dolan | B01D 53/02 95/105 |
| 9,682,342 B2 * | 6/2017 | Sadasivan Vijayakumari | B01D 53/047 |
| 9,943,890 B2 * | 4/2018 | Ramminger | B08B 9/032 |
| 9,947,425 B2 * | 4/2018 | Stellwag | G21F 9/30 |
| 2006/0191410 A1 * | 8/2006 | Dolan | B01D 53/047 95/96 |
| 2009/0151561 A1 * | 6/2009 | Song | B01D 53/047 95/100 |
| 2013/0152787 A1 * | 6/2013 | Boulet | B01D 53/0462 95/91 |
| 2014/0137598 A1 * | 5/2014 | Fleming, Jr. | A23L 3/3418 62/617 |
| 2015/0328577 A1 * | 11/2015 | Sadasivan Vijayakumari | B01D 53/047 518/705 |
| 2016/0133347 A1 | 5/2016 | Hill | |
| 2016/0325996 A1 * | 11/2016 | Matsushima | C01B 23/001 |

FOREIGN PATENT DOCUMENTS

| | | |
|---|---|---|
| DE | 102013214230 A1 | 1/2015 |
| EP | 0307581 A1 | 3/1989 |
| WO | 2006097217 A1 | 9/2006 |

\* cited by examiner

VENTILATION SYSTEM AND ASSOCIATED OPERATING METHOD FOR USE DURING A SERIOUS ACCIDENT IN A NUCLEAR INSTALLATION

CROSS-REFERENCE TO RELATED APPLICATION

This is a continuation application, under 35 U.S.C. § 120, of copending international application No. PCT/EP2016/050255, filed Jan. 8, 2016, which designated the United States; this application also claims the priority, under 35 U.S.C. § 119, of German patent application No. DE 10 2015 200 679.4, filed Jan. 16, 2015; the prior applications are herewith incorporated by reference in their entirety.

BACKGROUND OF THE INVENTION

Field of the Invention

In a nuclear power plant, a possibly significant release of radioactive fission products, in particular iodine, aerosols and inert gases, should be anticipated in accident or incident situations, depending on the accident in question and any counter measures that may have been introduced. In this case, before release into the surroundings of the power plant occurs, it should be assumed that there will also be a release and spread of activity in the power plant buildings (e.g. auxiliary installation building, switching facility, control room, etc.) on account of leakage of the containment. In this case, in addition to the release of aerosol-bound activity, in particular the release of inert gases is problematic for the power plant staff.

A huge release of inert gas may also occur when filtered pressure release is introduced and an inert gas cloud is formed over the power plant site. Depending on the weather conditions, longer-term pollution cannot be entirely excluded.

In order to introduce what are known as accident management measures, it is essential that the conditions in the control room, which is also referred to as the control station, allows operators to be present without the operators suffering unacceptable radiation exposure and contamination.

In the case of beyond-design-basis accidents involving a station blackout (SBO), the intended or normally operational ventilation systems and filter systems are no longer available for ensuring the essential ventilation-related parameters for maintaining the accessibility of the control room.

Previous designs provide isolation of the control room in order to overcome scenarios of this kind. The supply is achieved for example using mobile ventilation systems that are equipped with different filters. It is not possible to satisfactorily retain inert gas using these systems.

Other designs provide the control room with stored compressed air. However, storage in pressure vessels for a long period of time requires significant outlay and therefore limited. A more modular and mobile system design is practically impossible. Pressure accumulator designs additionally require significant outlay in the event of retrofitting in running installations.

SUMMARY OF THE INVENTION

The object of the invention is to specify a ventilation system for a control station of a nuclear installation or for a similar space accessible to operators that is as simple and compact as possible and that allows a supply of decontaminated fresh air at least for a period of a few hours in the event of serious accidents involving the release of radioactive activity, such that operators present in the control station are exposed as little as possible to radiation. In particular, the component of radioactive inert gases in the fresh air supplied to the control station should be as small as possible. Furthermore, the ventilation system should be as passive as possible and consume only a small amount of electrical power. In addition, a particularly advantageous method for operating a ventilation system of this kind should be specified.

The ventilation system according to the invention advantageously contains, inter alia, an aerosol and iodine filter module. In this case, the intake air into the supply air line is sucked in by a fan and guided over high-efficiency particulate air (HEPA) filters in order to separate the aerosols. After the particulate matter has been separated, radioactive iodine compounds are advantageously separated in an activated carbon filter bed. Impregnated activated carbon can be used to separate the radioactive methyl iodide by isotope exchange or salification. A particle filter is advantageously connected downstream of the activated carbon bed in order to retain abraded particles.

The air that is thus filtered is then fed to an inert gas module in a second process step. The inert gas module substantially contains two adsorber columns in a twin column configuration that are filled with adsorbent(s), preferably activated carbon. The adsorbent of the columns can also be composed of a plurality of layers of activated carbon and/or zeolite and/or molecular sieves.

The supply air enters the first adsorber column, the inert gases such as xenon and krypton being slowed by dynamic adsorption as they pass through the column. A filter for retaining adsorber particles is expediently arranged after the column.

The exhaust air from the spatial region to be supplied is at the same time guided over the second adsorber column where it causes backwashing of the previously accumulated inert gas activity, such that this column is again ready for loading after switching. The switching is carried out at the latest shortly before the activity breaks through into the first adsorber column, the column then being backwashed by the exhaust air. The switching is preferably triggered passively by a timer or an activity measurement.

The backwashing is advantageously assisted by a fan in the exhaust air line, the increase in volume of the exhaust air stream intensifying the backwash process of the inert gases on account of the negative pressure.

A throttle is advantageously provided in the exhaust air line of the control room, which throttle results in passive superheating of the exhaust air and thus in a reduction in the moisture present in the exhaust air (expansion drying). This is favorable for the speed of desorption of the inert gases in the adsorber column to be rinsed that is connected downstream.

A throttle and/or an air dryer are advantageously provided in the supply air line into the inert gas module in order to prevent too much moisture from being conveyed to the inert gas columns.

The inert gas module can additionally be equipped with a passive cold accumulator for increasing the k-values. In this connection, the k-value describes the adsorption capacity of the adsorber material for inert gas, for example in the unit $cm^3$ inert gas/g adsorbent. The k-value is dependent on the temperature, the pressure and the moisture content of the gas. The value is generally determined empirically.

The adsorber columns are preferably operated according to the pressure-swing method, i.e. negative pressure in the column to be rinsed and excess pressure in the column to be loaded (in each case in relation to atmospheric pressure), in order to improve the k-values of the columns and reduce the dimensions thereof. The excess pressure in the adsorber column through which the supply air flows is regulated by an adjustment valve in the supply air line.

The exhaust air, together with the backwashed inert gases, is emitted into the surroundings of the power plant at a sufficient distance from the supply air intake.

The ventilation system expediently contains a controller and corresponding adjustment members for through-flow and pressures.

The advantages achieved by the invention are in particular that, in addition to the air-borne activities in the form of aerosols and iodine/iodine compounds (in particular organoiodine), at the same time the radioactive inert gases are kept out of the supply air of the control room. Using the pressure swing and rinsing method for the twin columns, even long-lived inert gas isotopes such as krypton-85 can be reliably separated out of the supply air stream. The conditions required for removing the inert gases from the sorbent/adsorbent are passively assisted by expansion superheating. Electrical operating current is substantially required only for the fans in the supply air line and the exhaust air line and, to a limited extent, for the associated control unit and for the switching means for switching between operating cycles. This requirement can be met without difficulty for at least 72 hours using a stand-alone power supply module (e.g. by means of batteries and/or a diesel generator set).

In summary, in order to guarantee the accessibility of the control room, the following functions are ensured:
a) isolation of the control room ventilation from the remaining parts of the building;
b) excess pressure compared with the adjacent building spaces (e.g. <1 mbar);
c) maintenance of the admissible carbon monoxide and carbon dioxide concentration;
d) iodine retention;
e) aerosol retention;
f) retention of the inert gases (e.g. Kr, Xe);
g) limitation of the dose (e.g. <100 mSv/7 d);
h) limitation of the temperature in order to comply with the I&C temperature conditions; and
i) guarantee of the above-mentioned functions for at least 72 hours In a bulleted summary, further advantages are:
a) more modular and mobile system design;
b) less outlay and significant flexibility when being integrated into running installations;
c) less maintenance outlay;
d) storage of breathable air, requiring significant outlay, is omitted; and
e) it is possible to cover larger air volumes (change of air) and spatial regions.

Other features which are considered as characteristic for the invention are set forth in the appended claims.

Although the invention is illustrated and described herein as embodied in a ventilation system and associated operating method for use during a serious accident in a nuclear installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
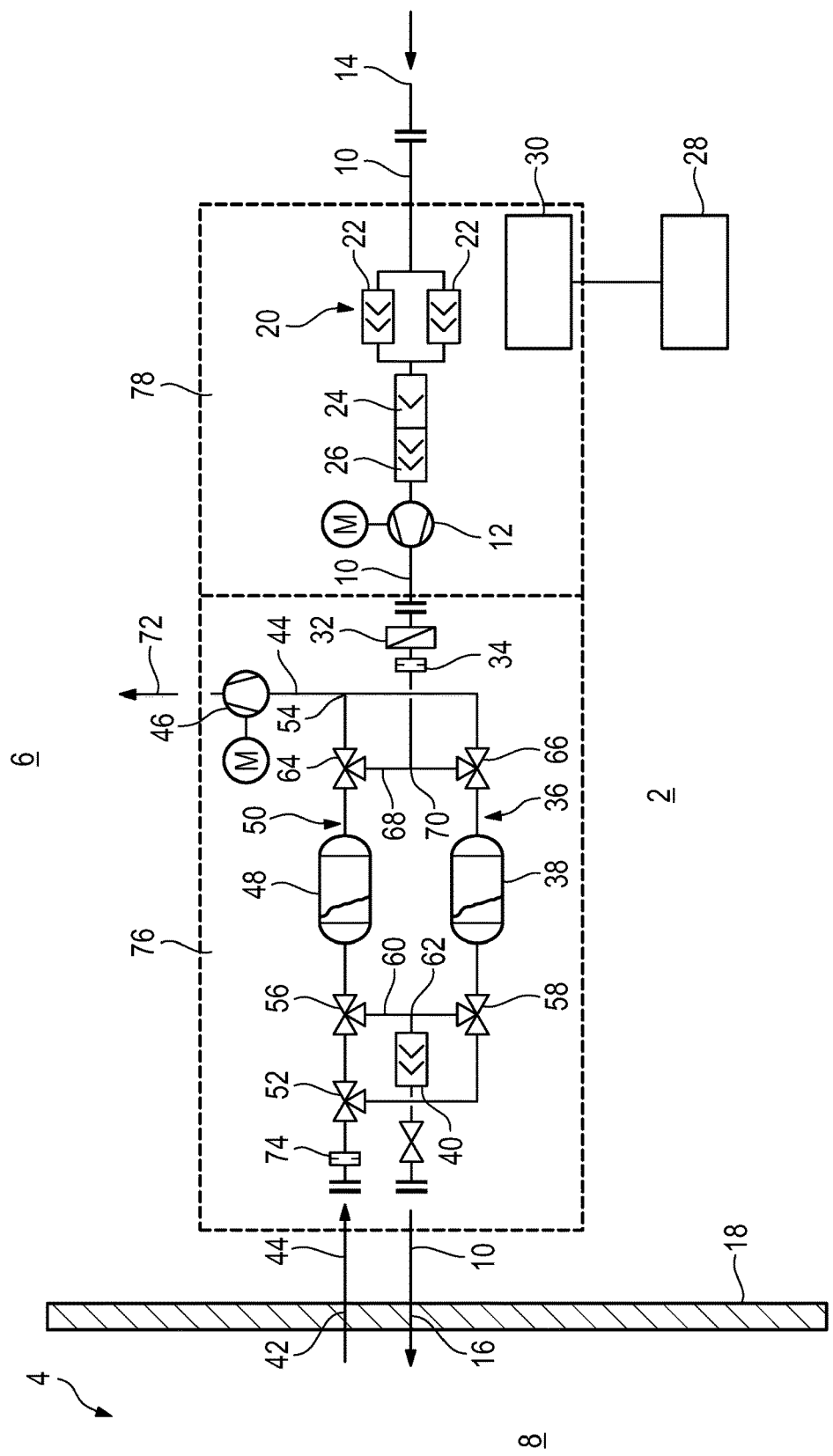
FIG. 1 is a block flow diagram of a schematic and highly simplified overview of a ventilation system for a control station of a nuclear power plant according to the invention.

Referring now to the figures of the drawings in detail and first, particularly to FIG. 1 thereof, there is shown an accident ventilation system, referred to for short as ventilation system 2. The ventilation system 2 is used to supply fresh air to a control station 4 (also referred to as a control room or main control room (MCR)) of a nuclear power plant 6 in accident or incident situations, in particular in the initial phase of a serious accident involving the release of nuclear fission products inside the power plant building and possibly also into the surroundings.

In scenarios of this kind, which are usually associated with failure of the autonomous power supply of the nuclear power plant 6 and thus also the failure of the normally operational ventilation system (not shown) for the control station 4, it is particularly important to be able to continue to keep the control station 4 manned for a certain amount of time—approximately up to 72 hours after the onset of the accident—without endangering the operators, in order to introduce and monitor initial countermeasures. The operators may also have to stay in the control station 4 until safe evacuation is possible following the decay of an initial activity maximum in the surroundings.

For this purpose, the ventilation system 2 for the control station 4 is configured to supply decontaminated and oxygen-rich fresh air (also referred to as supply air) from the surroundings of the control station 4 or of the power plant building and is equipped with corresponding filter and purification stages. In addition, the ventilation system 2 brings about the removal of spent and carbon dioxide-rich air (also referred to as exhaust air) from the control station 4 into the surroundings. In contrast with other designs that have been conventional up to now, neither a supply of fresh air from an associated compressed air storage system, nor any significant recirculation and reprocessing of the air in the interior of the control station 4 is provided here.

Specifically, a supply air line 10, also referred to as a fresh air supply line or fresh air line for short, is connected to an interior 8 of the control station 4 which is at least approximately hermetically encapsulated with respect to the external surroundings, via which line fresh air is sucked from the surroundings and conveyed into the interior 8 by a fan 12 during operation of the ventilation system 2. The suction inlet, or inlet 14 for short, of the supply air line 10 can be located at some distance from the control station 4, in particular outside the power plant building. Depending on the progression of the accident, the fresh air sucked in through the inlet 14 may nonetheless be significantly contaminated with radioactive fission products, in particular in the form of aerosols, iodine and iodine compounds, as well as inert gases. These components need to be removed as completely and reliably as possible from the fresh air stream (also referred to as the supply air stream) before the air steam is introduced into the interior 8 of the control station 4 through a lead-through 16 in the enclosing wall 18 (shown only in portions).

For this purpose, a first filter stage in the form of an aerosol filter 20, formed in the example here by two HEPA filters 22 that are connected in parallel in terms of flow, is connected into the supply air line 10 downstream of the inlet 14, viewed in the direction of flow of the supply air. he HEPA filters 22 accordingly bring about highly efficient separation of the aerosol particles (also referred to as floating particles) out of the fresh air stream, in particular with respect to the isotopes Te, Cs, Ba, Ru, Ce, La.

Further downstream, a second filter stage containing an iodine filter 24 and a particle filter 26 connected downstream thereof are connected into the supply air line 10. The iodine filter 24 is preferably formed as an activated carbon filter bed having a layer thickness of from 0.1 m to 0.5 m for example. Following the separation of the particulate matter previously carried out in the aerosol filter 20, radioactive iodine compounds and elementary iodine having a k-value of >8 at contact times of from 0.1 to 0.5 seconds for example, are separated in the iodine filter 24. Impregnated activated carbon (e.g. containing potassium iodide as the impregnating agent) can be used in order to separate the radioactive methyl iodide by isotope exchange or salification. The particle filter 26 that is connected downstream of the iodine filter 24 is provided in order to retain abraded particles from the activated carbon bed.

A conveyor fan, or fan 12 for short, for transporting the fresh air stream is connected into the supply air line 10 downstream of the second filter stage. The preferably electrically operated fan 12 has a suction capacity in the range of from 100 to 6,000 m³/h for example.

In order to provide the necessary operating current, a stand-alone power supply module 28 is provided that is independent of the normally operational autonomous power supply and preferably also of the conventional (installation-wide) emergency power supply, for example on the basis of electrical batteries/accumulators and/or a diesel generator set. The power supply module 28 is activated, if required, preferably independently in the manner of an uninterruptible power supply or, alternatively, is actuated by an associated control unit 30.

Further downstream, an air dryer 32, also referred to as a cold trap, is optionally also connected into the supply air line 10, by which dryer condensable components can be separated out of the fresh air stream. This may, for example, be a passive cold trap containing silica gel and/or ice as a desiccant. As a result, the moisture content of the fresh air stream flowing into the functional units (see below) connected downstream is reduced. A throttle 34, which is alternatively or additionally provided and is arranged in the embodiment here downstream of the air dryer 32 in the direction of flow of the fresh air, fulfils the same purpose and acts on the fresh air stream in accordance with the principle of expansion drying. This may in particular be a controllable throttle valve.

After being filtered and dried, when associated adjustment members (see below) are adjusted accordingly, the fresh air stream flows through the line portion 36 for example, into which an inert gas adsorber column, or adsorber column 38 for short, is connected. In the process, the inert gases, in particular xenon and krypton, contained in the fresh air stream are bound, within the context of a dynamically occurring equilibrium, by physical and/or chemical adsorption, to the adsorbent present in the adsorber column 38 and the gases are thus slowed in the line portion 36, as long as the adsorption capacity of the adsorber column 38 is not exhausted. In particular, one or more layers of activated carbon and/or zeolite and/or molecular sieves can be provided as the adsorbent.

A line portion leading to the control station 4 is connected downstream of the adsorber column 38, into which line portion a particle filter 40 for retaining detached adsorber particles is connected.

Finally, the fresh air stream that has been decontaminated in the manner described enters the interior 8 of the control station 4 via the lead-through 16 through the enclosing wall 18 of the control station, such that this unspent, oxygen-rich breathable air is supplied at an activity level that is permissible for the operators.

The air exchange is completed by spent, carbon dioxide-rich breathable air being removed from the control station 4 via the exhaust air line 44 that is connected to the interior 8 of the control station and is guided through the lead-through 42 in the enclosing wall 18 and into the surroundings, and into which line a fan 46 is connected in order to assist the gas transport. The fan is preferably an electrically operated fan 46 which, just like the fan 12, is supplied with electrical power by the power supply module 28.

Since, at a feasible installation size, the adsorption capacity of the adsorber column 38 acting on the fresh air stream is usually exhausted after just a relatively short operating time, the ventilation system 2 is configured to backwash the adsorbed inert gases into the surroundings during operation. For this purpose, two substantially structurally identical adsorber columns 38 and 48 are provided, to which columns fresh air or exhaust air is applied via corresponding line branches and connections and adjustment members, here in the form of 3-way valves, such that one of the two adsorber columns 38 and 48 acts on the fresh air stream in adsorption mode as already described, while the other column is simultaneously backwashed by the exhaust air stream in desorption mode or rinsing mode, and is thus made ready for the next adsorption cycle. By switching the adjustment members, the role of the adsorber columns 38 and 48 can be interchanged, and it is thus possible to swap in a cyclical manner between adsorption mode and desorption mode with respect to the relevant columns.

In the embodiment shown in the drawings, this function is achieved in that one adsorber column 38 is arranged in the line portion 36, and the other adsorber column 48 is arranged in the line portion 50, in an antiparallel connection in terms of flow. The two line portions 36 and 50 come together on one side in the 3-way valve 52 and on the other side in the confluence 54 arranged on the suction side of the fan 46. Furthermore, a cross connection 60 that can be switched by the two 3-way valves 56 and 58 and that is connected by a T-connection 62 to the portion of the supply air line 10 leading to the particle filter 40 is connected between the two line portions 36 and 50 on one side between the 3-way valve 52 and the two adsorber columns 38, 48. A cross connection 68 that can be switched by the two 3-way valves 64 and 66 and that is connected by a T-connection 70 to the portion of the supply air line 10 coming from the throttle 34 is connected, in an analogous manner, on the other side between the adsorber columns 38, 48 and the confluence 54.

When the valve settings are selected accordingly, as already described above, the supply air coming from the throttle 34 flows through the T-connection 70, the 3-way valve 66, the lower adsorber column 38 in the drawing, the 3-way valve 58 and the T-connection 62 to the particle filter 40, and from there onwards to the control station 4. In the other line strand, the exhaust air coming from the control station 4 flows through the 3-way valve 52, the 3-way valve 56, the upper adsorber column 48 in the drawing and the 3-way valve 64 to the suction connection of the fan 46, and from there onwards to an exhaust air flue or to another outlet 72 that is expediently located at a distance from the inlet 14 for fresh air.

In other words, in this operating mode the inert gases accumulated in the adsorber column 48 by adsorption during the previous cycle are desorbed from the adsorbent by the substantially inert gas-free exhaust air from the interior 8 of the control station 4, and are washed back into the surroundings together with the exhaust air stream. The backwashing is assisted by the fan 46 that is arranged downstream of the backwashed adsorber column 48, the increase in volume of the exhaust air stream being intensified by the negative pressure of the backwash process for the inert gases.

A throttle 74, preferably in the form of an adjustable throttle valve, is arranged in the exhaust air line 44 of the control room, upstream of the 3-way valve 52 and thus upstream of the adsorber column 48 currently in rinsing mode, when viewed in the direction of the exhaust air flow, which throttle causes passive overheating of the exhaust air and thus a reduction in the moisture in the exhaust air (expansion drying). This is favorable for the speed of desorption of the inert gases in the adsorber column 48 connected downstream.

After switching, the roles of the adsorber columns 38 and 48 are interchanged. Now, the fresh air flows from the throttle 34, through the 3-way valve 64, the adsorber column 48 and the 3-way valve 56 to the particle filter 40, and from there to the control station 4. The exhaust air from the control station 4, in contrast, flows from the throttle 74, through the 3-way valve 52, the 3-way valve 58, the adsorber column 38 and the 3-way valve 66 to the fan 46, and from there to the outlet 72. The previously loaded adsorber column 38 is now backwashed by the exhaust air, while the adsorber column 48 is available for purifying the fresh air and accordingly for being loaded again.

A control unit 30 is provided for controlling the switching processes by the 3-way valves 52, 56, 58, 64, 66, which control unit expediently also actuates the two fans 12 and 46 and, optionally, further adjustment members for through-flow and pressures. It is obvious to a person skilled in the art that the switching function can also be achieved in an equivalent manner using other line topologies and adjustment members.

As shown by the dashed boundary lines, the ventilation system 2 is preferably constructed in a modular manner from an inert gas module 76, an iodine and aerosol module 78 and a power supply module 28. The boundaries between the modules can of course also be selected so as to be different in detail, and there may be further modules or sub-modules. The individual modules are for example accommodated in a transportable manner in standard containers, so that the modules can be easily transported to the usage site and easily constructed at the site by means of the associated, standardised line connections being connected.

Figure 2:
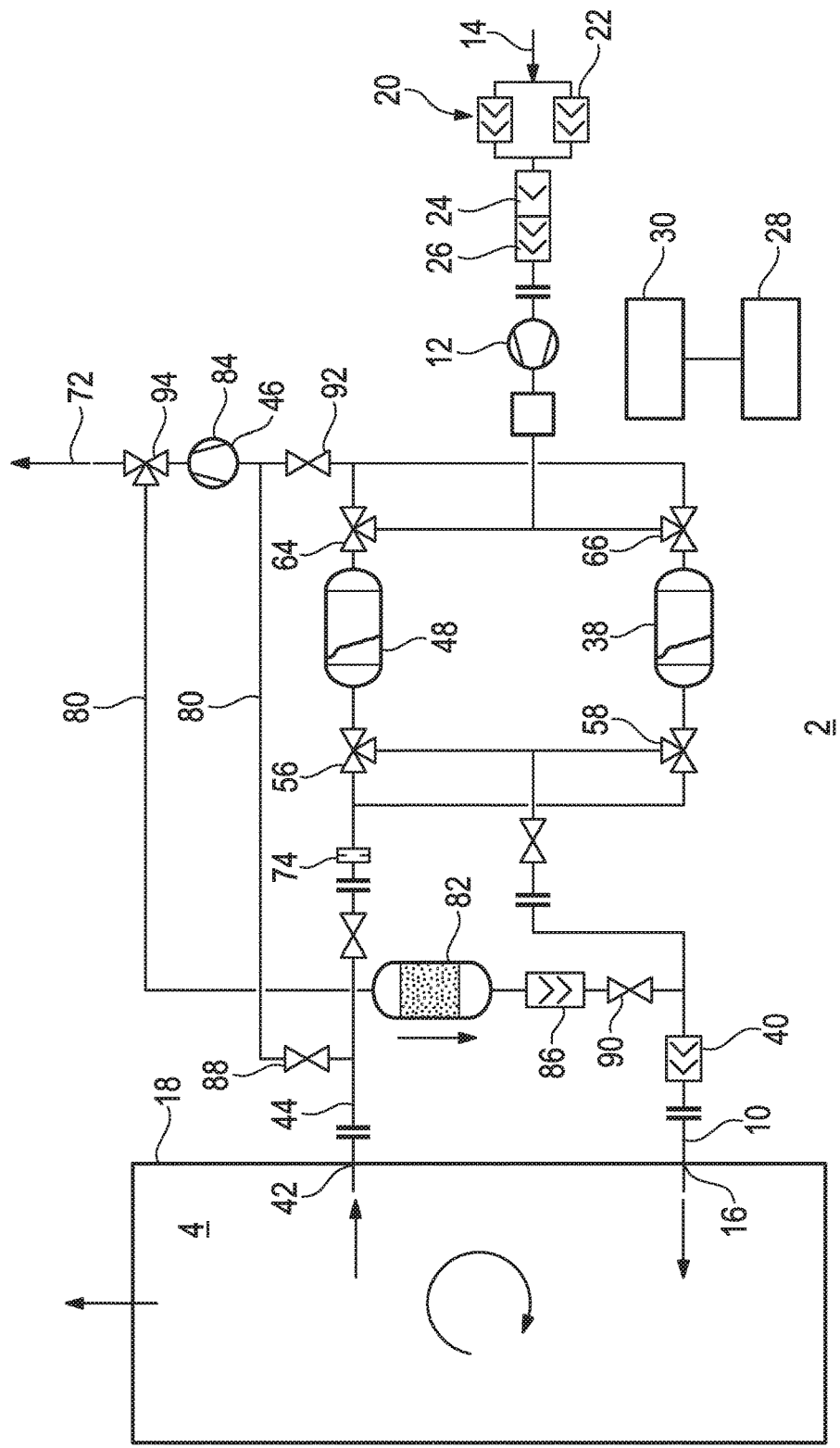
FIG. 2 is a block flow diagram showing a modification (extension) of the system shown in FIG. 1.

The variant of the ventilation system 2 shown in FIG. 2 contains, in addition to the components known from FIG. 1, a retaining unit for carbon dioxide ($CO_2$), preferably containing a $CO_2$ adsorber column 82 that is based predominantly on chemical adsorption (chemisorption) or adsorption. It is therefore possible to operate the control station 4 for a certain amount of time in circulating-air mode without (filtered) breathable air being fed in from the outside, without the $CO_2$ concentration in the control station 4 exceeding a critical value for the well-being of the operators. This is advantageous in that no activity can penetrate into the control station 4 in circulating-air mode in the event of extreme activity loads outside the containment.

The $CO_2$ adsorber column 82 is preferably integrated into the system known from FIG. 1 in that a recirculation line or circulating-air line 80 is provided, which line branches off from the exhaust air line 44 and leads to the supply air line 10 and into which the $CO_2$ adsorber column 82 is connected. Thus, in circulating-air mode, a circulating-air fan 84 connected into the circulating-air line 80 conveys the $CO_2$-rich exhaust air removed from the control station 4 through the $CO_2$ adsorber column 82 and back into the control station 4 at a reduced $CO_2$ content as breathable air. The $CO_2$ adsorption is carried out almost at the pressure prevailing inside the control station 4, i.e. approximately at atmospheric pressure or slightly higher (prevention of inleakage; see below). As a result, the circulating-air fan 84 does not have to carry out any significant compression.

Specifically, in the example shown, the inlet side of the circulating-air line 80 is connected by a line branch (e.g. a T-piece) to the line portion of the exhaust air line 44 located between the lead-through 42 to the control station 4 and the throttle 74. The outlet side of the circulating-air line 80 is connected by a line branch to the line portion of the supply air line 10 located between the lead-through 16 and the 3-way valve 58, here in particular upstream of the particle filter 40. Additionally or alternatively, filters 86 can be connected into the circulating-air line 80, here for example downstream of the $CO_2$ adsorber column 82 (the flow direction in circulating-air mode is indicated by a flow arrow beside the column).

With regard to the connection of the circulating-air system to the remainder of the ventilation system 2, modifications are of course possible, but the variant shown is advantageous in particular in that just two lead-throughs 16, 42 in total are required through the enclosing wall 18 of the control station 4/through the containment. It is furthermore advantageous that, in circulating-air mode, the part of the ventilation system 2 containing the inert gas adsorber columns 38, 48 and the upstream components can be easily and reliably disconnected and/or isolated from the circulating-air system in terms of flow and media by corresponding shut-off devices or valves.

The circulating-air line 80 itself is provided with shut-off valves 88, 90 on the inlet side and the outlet side in order to be able to isolate said line from the remainder of the line system if required. Preferably, the shut-off valves 88, 90 can be controlled with regard to the through-flow (control valves), so that partial flows can also be adjusted. This also applies to the further valves, in particular the shut-off valves 92, 94 described below.

It is possible to provide an individual, separate circulating-air fan 84 for the circulating-air line 80. It is particularly advantageous, however, in the variant according to FIG. 1, to exclusively use fans 46 used as exhaust air fans in the exhaust air line 44 within the meaning of a dual use as circulating-air fans 84 during the circulating-air mode. For this purpose, the circulating-air line 80 is connected by suitable line branches or connections to a line portion of the exhaust air line 44 that contains the fan 46. This line portion can be isolated from the outlet 72 and from the part of the ventilation system 2 containing the inert gas adsorber columns 38, 48 by shut-off valves 92, 94, and forms a portion of the circulating-air line 80 in circulating-air mode. As shown, the $CO_2$ adsorber column 82 is preferably arranged downstream of the fan 46 (or, more generally, the circulating-air fan 84) on the pressure side thereof.

The shut-off valve 94 is preferably a controllable 3-way valve on the line branch, which valve releases the outlet 72 and shuts off the connected strand of the circulating-air line 80 during desorption (backwashing) of the inert gas adsorber column 38 or 48. This ensures that the activities released from the inert gas adsorber columns 38 or 48 during desorption are blown out into the surroundings and are not transported into the control station 4 via the circulating-air line 80. Inert gas desorption mode (rinsing of the inert gas adsorber column 38 or 48) and $CO_2$ adsorption mode (circulating-air mode) are therefore preferably not operated simultaneously.

However, inert gas adsorption mode (loading of the inert gas adsorber column 38 or 48) and $CO_2$ adsorption mode (circulating-air mode) can be operated simultaneously without difficulty. In this case, filtered fresh air is blown into the control station 4 by at least one of the two inert gas adsorber columns 38 or 48 and the supply air line 10. When the shut-off valve 88 is open, the exhaust air from the control station 4 is transported through the circulating-air line 80 by means of the fan 46. Depending on the setting of the shut-off valve 94 that is configured as a 3-way control valve, in the process a larger or smaller partial flow (which can optionally also have the value of zero) is released through the outlet 72 into the surrounding atmosphere, and the remainder of the partial flow is returned to the control station 4 via the $CO_2$ adsorber column 82. In this case, the shut-off valve 92 is closed, and therefore, as mentioned above, the undesired return of activities from the inert gas adsorber columns 38 or 48 into the control station 4 is prevented.

A further possible mode of operation contains operating the inert gas adsorber columns 38 or 48 simultaneously in adsorption and desorption mode in a recurrently alternating manner, as already described in conjunction with FIG. 1. In this operating mode, as mentioned above preferably no $CO_2$ adsorption occurs in circulating-air mode.

However, it has been found that the physical adsorption in the inert gas adsorber columns 38 or 48 is significantly more effective at a higher pressure (for example 8 bar) than at atmospheric pressure, whereas the desorption preferably takes place at a relatively low pressure, in particular at a slight negative pressure in relation to atmospheric pressure. As a result, following each change-over process (switching) a certain amount of time, for example from 10 to 30 minutes, must be planned in for the required pressure increase using the fan 12 that operates as a compressor. In this pressure increase phase, during which the retaining capacity of the inert gas adsorber columns 38 or 48 is not yet fully developed, the control station 4 is preferably ventilated only by means of $CO_2$ adsorption in circulating-air mode. In the process, although the oxygen content of the air in the control station 4 occupied by operators gradually reduces due to being consumed, the $CO_2$ content is reliably kept below a critical value. Later, once the operating pressure required for effective inert gas retention has been reached, a switch is preferably made to the filtered air supply via the inert gas adsorber columns 38 or 48 (simultaneous operation of inert gas adsorption and $CO_2$ adsorption, as described above). As a result, the oxygen content of the air in the control station 4 which had previously dropped is renewed. Later, regeneration phases (desorption) can be carried out when the circulating air is cut off, and the adsorber columns 38 and 40 can be interchanged.

In other words, a preferred mode of operation of the ventilation system 2 according to FIG. 2 contains supplying the control station 4 preferably exclusively in circulating-air mode during the time period required for increasing the pressure in the adsorber columns 38, 48. After the pressure increase, fresh air is fed in via the inert gas hold-up line by the adsorber columns 38, 48, preferably during/together with the chemical $CO_2$ adsorption. The increased volumetric flow is preferably used for maintaining the oxygen concentration and for increasing the pressure in the control station 4. As a result, a directed flow is generated that has an overpressure in the control station 4 compared with the external surroundings, which flow reliably prevents activity from penetrating into the control station 4 from the outside (inleakage). Simple systems that operate only by $CO_2$ separation cannot ensure this function in a sufficiently reliable manner.

The adsorbent used for $CO_2$ adsorption in the adsorber column 82 can be soda lime, zeolite/a molecular sieve or a regeneratable adsorbent for example. In particular, oxides, peroxides and superoxides (e.g. potassium superoxide) can be used as further examples of possible adsorbents. Regeneratable adsorbents can also consist of metal oxides or mixtures thereof. Thus, for example, silver oxide reacts with $CO_2$ to form silver carbonate. In principle, mixtures of the mentioned adsorbents can also be used, or multi-stage adsorber columns having the same or different adsorbents in the different stages can be implemented.

When the adsorbent is correspondingly suitable, the chemisorption occurring in the adsorber column 82 can be carried out so as to be reversible at high temperatures, and the adsorbent can in principle be regenerated. Simple modifications in the line arrangement of the circulating-air system may be expedient for this purpose in order to be able to carry out regeneration phases of this kind outside the above-described circulating-air mode without polluting the control station 4.

In summary, the systems according to FIG. 1 and FIG. 2 ensure that, in addition to the air-borne activity of the aerosols and organoiodine, the inert gases are also kept out of the breathable air of the control room. In the extended system according to FIG. 2, the $CO_2$ is additionally removed from the breathable air by means of chemical adsorption/absorption.

Integrating the direct $CO_2$ adsorption makes it possible for the control station 4 to be operated in circulating-air mode, in extreme accident situations, until the oxygen concentration of the control room air drops to a lower threshold (approximately 17-19 vol. %) and therefore a fresh air supply from the outside is required. The inert gas retaining module containing the adsorber columns 38, 48 is then operated in particular in order to meet and raise the oxygen content. As a result, the required capacity of the module can be significantly reduced with regard to the driving energy and the amount of activated carbon. The required compression energy for producing the pressure-swing adsorption can be minimised. As a result, the units required for autonomously generating power can be made smaller.

Even though the description has so far been directed to the ventilation of the (central) control station of a nuclear power plant, it is nonetheless clear that the ventilation system 2 can also be used for ventilation, in the event of accidents, of other spatial regions within a nuclear power plant or, more generally, a nuclear installation, such as also fuel element stores, reprocessing plants, fuel-processing facilities, etc., for example of auxiliary installation buildings, switching facility spaces, control rooms or other operating and monitoring spaces. The term "operating space" is also used for spaces of this kind, in the manner of a summary and a key word.

The following is a summary list of reference numerals and the corresponding structure used in the above description of the invention:
2 ventilation system
4 control station
6 nuclear power plant
8 interior
10 supply air line
12 fan
14 inlet
16 lead-through
18 enclosing wall
20 aerosol filter
22 HEPA filter
24 iodine filter
26 particle filter
28 power supply module
30 control unit
32 air dryer
34 throttle
36 line portion
38 adsorber column
40 particle filter
42 lead-through
44 exhaust air line
46 fan
48 adsorber column
50 line portion
52 3-way valve
54 confluence
56 3-way valve
58 3-way valve
60 cross connection
62 T-connection
64 3-way valve
66 3-way valve
68 cross connection
70 T-connection
72 outlet
74 throttle
76 inert gas module
78 iodine and aerosol module
80 circulating-air line
82 $CO_2$ adsorber column
84 circulating-air fan
86 filter
88 shut-off valve
90 shut-off valve
92 shut-off valve
94 shut-off valve

The invention claimed is:

1. A ventilation system for an operating space accessible to operators in a nuclear installation, the ventilation system comprising:
an external inlet;
a supply air line guided from said external inlet to the operating space;
a first fan connected in said supply air line;
a first inert gas adsorber column connected in said supply air line;
an external outlet;
an exhaust air line guided from the operating space to said external outlet;
a second fan connected in said exhaust air line;
a second inert gas adsorber column connected in said exhaust air line;
a switching device for interchanging roles of said first and second inert gas adsorber columns;
a circulating-air line;
a $CO_2$ adsorber column connected in said circulating-air line; and
a circulating-air fan connected in said circulating-air line, said circulating-air line leading away from and back to the operating space, said second fan being able to be connected into said circulating-air line as said circulating-air fan.

2. The ventilation system according to claim 1, wherein said circulating-air line having an inlet side connected to said exhaust air line and an outlet side connected to said supply air line.

3. The ventilation system according to claim 1, wherein said first fan is disposed upstream of said first inert gas adsorber column, viewed in a direction of flow of supply air.

4. The ventilation system according to claim 3, further comprising at least one of a throttle or an air dryer connected into said supply air line between said first fan and said first inert gas adsorber column.

5. The ventilation system according to claim 1, wherein said second fan is disposed downstream of said second inert gas adsorber column, viewed in a direction of flow of exhaust air.

6. The ventilation system according to claim 1, further comprising a throttle connected into said exhaust air line upstream of said second inert gas adsorber column, viewed in a direction of flow of exhaust air.

7. The ventilation system according to claim 1, further comprising:
an iodine filter connected into said supply air line; and
an aerosol filter connected into said supply air line.

8. The ventilation system according to claim 7, wherein said iodine filter and said aerosol filter are disposed upstream of said first fan, viewed in a direction of flow of supply air.

9. The ventilation system according to claim 1, further comprising a stand-alone power supply module.

10. The ventilation system according to claim 1, wherein said switching device contains a plurality of 3-way valves.

11. A method for operating a ventilation system for an operating space accessible to operators in a nuclear installation, which comprises the steps of:
connecting into a supply air line being guided from an external inlet to the operating space, a first fan and a first inert gas adsorber column;
connecting into an exhaust air line being guided from the operating space to an external outlet, a second fan and a second inert gas adsorber column;
providing a switching device for interchanging roles of the first and second inert gas adsorber columns;
flowing supply air through one of the inert gas adsorber columns and the one inert gas adsorber column thus being loaded with radioactive inert gases, and exhaust air simultaneously flowing through the other inert gas adsorber column and the other inert gas adsorber column thus being backwashed, and in which roles of the first and second inert gas adsorber columns are interchanged by switching as soon as an adsorption capacity of a currently loaded inert gas adsorber column is exhausted; and
providing a circulating-air line, into which a $CO_2$ adsorber column and a circulating-air fan are connected, the circulating-air line leads away from and back to the operating space, pressure being built up at least in one of the inert gas adsorber columns by means of the first fan, and, simultaneously, $CO_2$ reduction being carried out by the $CO_2$ adsorber column in a circulating-air mode.

12. The method according to claim 11, wherein, while the pressure is being built up, the operating space is ventilated exclusively by circulating air decontaminated from $CO_2$.

13. The method according to claim 11, which further comprises simultaneously feeding supply air to the operating space by means of at least one of the inert gas adsorber columns, and $CO_2$ reduction is carried out by the $CO_2$ adsorber column in the circulating-air mode.

14. The method according to claim 11, which further comprises using the first fan as the circulating-air fan.

* * * * *